United States Patent [19]

Checkly et al.

[11] Patent Number: 4,865,158

[45] Date of Patent: Sep. 12, 1989

[54] VERTICAL BALE ELEVATOR

[76] Inventors: Robert W. Checkly; Rudy B. Nielsen, both of R.R. #3, Arthur, Ontario, Canada, N0G 1A0

[21] Appl. No.: 151,939

[22] Filed: Feb. 3, 1988

[51] Int. Cl.[4] .............................................. B66B 9/00
[52] U.S. Cl. ...................................... 187/7; 414/300; 198/625
[58] Field of Search .................... 187/7, 6, 1 R, 24, 25, 187/9 E; 414/589, 299, 300; 198/608, 604, 624, 625

[56] References Cited

U.S. PATENT DOCUMENTS

| | | | |
|---|---|---|---|
| 1,933,404 | 10/1933 | Allen et al. | 198/625 |
| 2,106,380 | 1/1938 | Roberts, Jr. | 198/625 |
| 2,528,945 | 11/1950 | Carpenter | 198/625 |
| 2,806,678 | 9/1957 | Stevens et al. | 198/608 |
| 2,988,203 | 6/1961 | Peterson | 198/608 |
| 3,176,829 | 4/1965 | Wathen | 198/625 |
| 3,310,184 | 3/1967 | Dauer | 414/299 |
| 3,964,492 | 6/1976 | Crego et al. | 198/625 |

FOREIGN PATENT DOCUMENTS

| | | | |
|---|---|---|---|
| 156913 | 9/1982 | Japan | 198/625 |
| 331939 | 8/1958 | Switzerland | 187/6 |

Primary Examiner—Joseph J. Rolla
Assistant Examiner—Kenneth Noland
Attorney, Agent, or Firm—Daryl W. Schnurr

[57] ABSTRACT

A vertical bale elevator to transfer bales of hay, straw or the like between the ground and a barn has an elongated frame with two opposing augers mounted on opposite sides of the frame. The frame contains a guide for the blades. The augers are mirror images of one another and rotate in opposite directions to force a bale upward and rearward within a frame. The guide is arranged to receive a bale in the bottom section and discharge the bale in the top section. The augers are powered by a single power source that can be reversed to move bales down the elevator rather than up. When operating in reverse, it is usually desirable to make changes to the guide. The middle sections are made in various lengths so that the total height of the elevator can be varied. With previous elevators, a chain rotates upward at a back and front of the elevator. These previous elevators are much more complex.

17 Claims, 4 Drawing Sheets

VERTICAL BALE ELEVATOR

BACKGROUND OF THE INVENTION

1. Field of the Invention

This invention relates to a vertical bale elevator to transfer bales of hay, straw or the like between the ground and an upper level or a barn or other storage area.

2. Description of the Prior Art

Previous vertical bale elevators have continuous conveyor chains located at a front and back of a frame. The chains have prongs extending normal thereto periodically along their length. The prongs penetrate a bale to carry it upward as the chains rotate. Previous elevators jam easily, or, cannot transfer bales of various sizes, or, consume a great deal of power, or cannot easily be divided into sections as the chains must be either lengthened or shortened, or, are complex in that adjustments must be made in the chain tautness before the elevator will function properly, or, the elevator requires more than one power source, or, the elevator will not transfer bales that are bowed, or, the elevator will not transfer bales that are not tightly packed, or, the drive mechanism is complex and a skilled technician is required to make repairs, or, the the chain tends to break when the elevator becomes jammed, or, the elevator cannot be used in reverse to transfer bales downward, or, bales can only be discharged at an upper end, or, the vertical section of the elevator must be located high off the ground so that the angle with the feed section is about 135° so bales can usually be transferred between sections without jamming.

SUMMARY OF THE INVENTION

It is an object of the present invention to provide a vertical bale elevator that is simple in design and can be manufactured in sections that can easily be interconnected to one another to create an elevator of virtually any reasonable length and yet can be used to transfer bales smoothly into or out of a storage area.

A vertical bale elevator to transfer bales of hay, straw or the like between a supporting surface and a point above the supporting surface has a base section, a top section and one or more middle sections, each section having an elongated frame with a cross-section somewhat larger than the cross-section of the bale. The elongated frame of one section is designed to fit with the elongated frame of immediately adjacent sections. The base section has means to receive a bale and the top section has means to discharge a bale. All sections have augers extending along opposing sides thereof, the augers of one section being designed to interconnect with the augers of immediately adjacent sections, said augers each being capable of rotating so that all augers exert a force on a bale in the same direction. The augers are arranged so that a bale can be transported between the augers along the frame with part of a flight of each auger penetrating opposing sides of the bale. The frame provides guide means for the bales and the elevator has a power source to rotate the augers.

DESCRIPTION OF A PREFERRED EMBODIMENT

Figure 1:
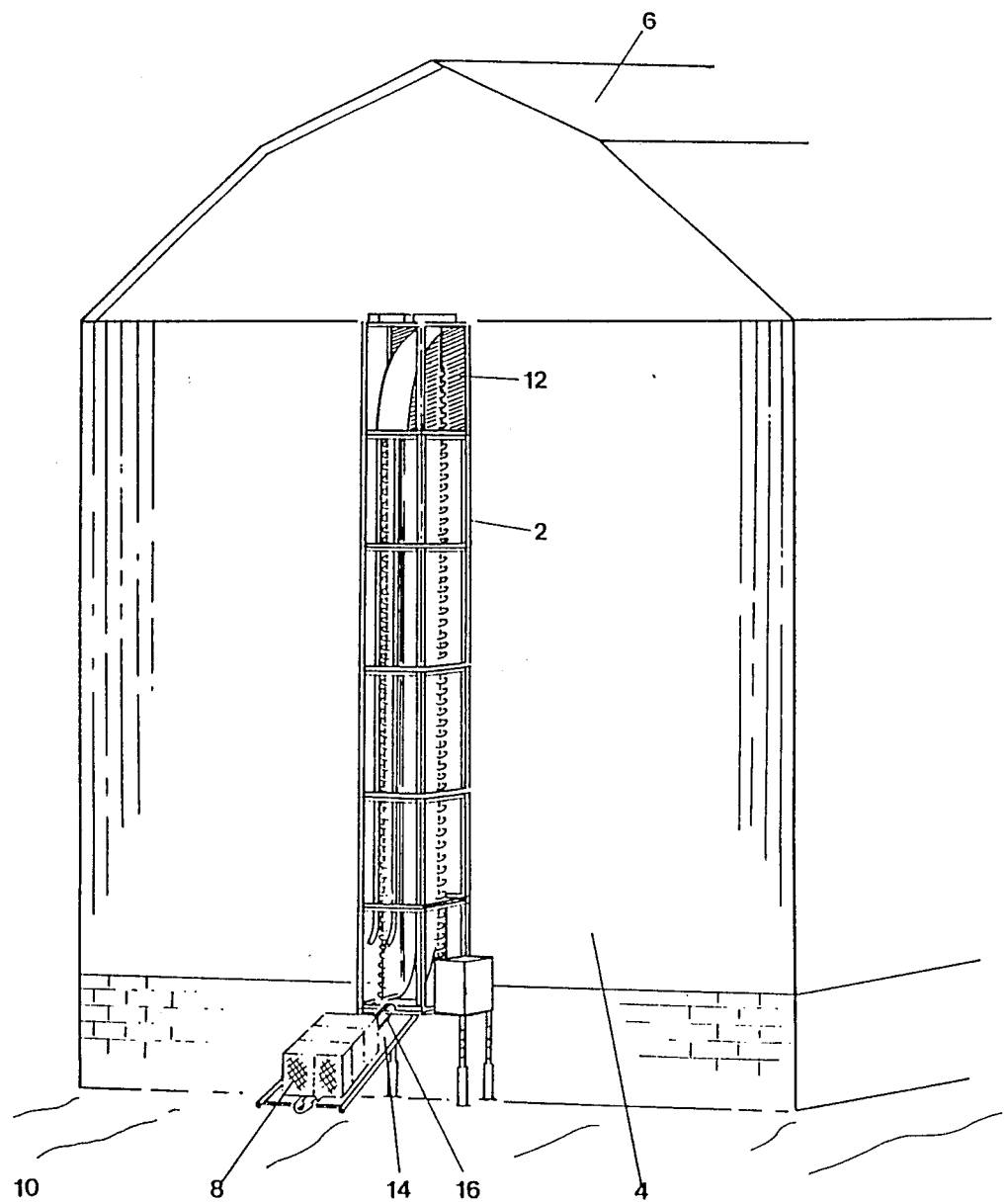
FIG. 1 is a perspective schematic view of a vertical bale elevator mounted adjacent to a barn.

Referring to the drawings in greater detail, in FIG. 1 there is shown a vertical bale elevator 2 mounted adjacent to an outside wall 4 of a barn 6. It can be seen that the elevator 2 can be used to transfer bales 8 of hay, straw or the like between a supporting surface 10 and a point 12 above the supporting surface 10. The supporting surface 10 is the ground and the point above the supporting surface is an opening in the barn wall 4. A conveyor 14 is conventional and contains a conveyor chain 16. The conveyor 14 is used to feed bales into the elevator 2.

Figure 2:
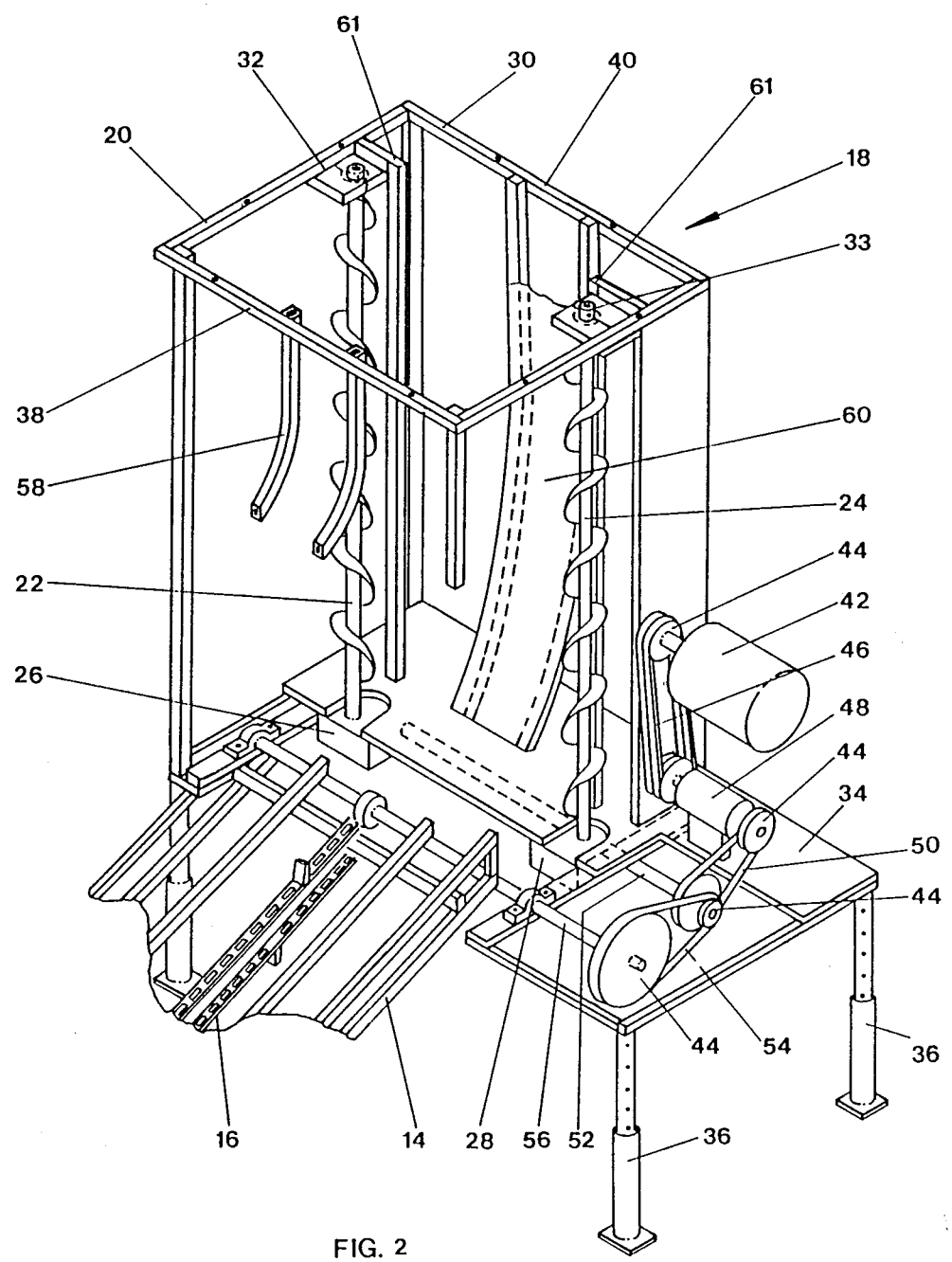
FIG. 2 is a perspective view of a receiving section of a bale elevator.

Referring to FIG. 2 in greater detail, there is shown a base section 18 having an elongated frame 20. Parts of the frame 20 are shown to be cut off so as not to interfere with the background. The frame 20 is designed to fit with the elongated frame of an immediately adjacent section (not shown in FIG. 2). It can be seen that the elongated frame 20 has a cross-section somewhat larger than the cross-section of a bale (not shown in FIG. 2). Two opposing augers 22, 24 are mounted on opposite sides of the frame 20 towards a front of said frame. The augers 22, 24 are mounted in gear boxes 26, 28, respectively. At an upper end 30 of the base section 18, each auger 22, 24 is rotatably mounted in hardwood bearings 32. A cylindrical sleeve 33 assists in holding the augers in the bearings. The base section 18 has a platform 34 which is mounted on adjustable legs 36. The frame 20 has a front 38 and rear 40. section 18 is designed to receive a bale. The auger 22 on the left-hand side of the frame 20 is a left-hand auger and the auger 24 on the right-hand side of the frame 20 is a right-hand auger. The augers 22, 24 are powered by a single power source, being a motor 42 which is connected by pulleys 44 and belts 46 to a reduction shaft 48. The reduction shaft 48 is connected by pulleys 44 and a belt 50 to a drive shaft 52. The drive shaft 52 extends through gear boxes 28, 26 to drive the augers 24, 22 respectively, in opposite directions. The shaft 52 is connected by pulleys 44 and a belt 54 to a drive shaft 56 for the chain 16 of the conveyor 14. When the elevator is used to move bales upward, each auger 22, 24 turns in a direction to force a bale (now shown in FIG. 2) within the elevator towards a rear 40 of said frame 20. In other words, when viewed from above, the auger 22 turns counterclockwise and the auger 24 turns clockwise. In this way, a bale being moved up the elevator will be forced toward the rear 40 of the frame 20 and the bale will be easily discharged from the elevator towards the rear 40. While the elevator will still work if the augers were each turned in the opposite direction so as to force a bale outward towards the front 38, this direction of rotation is not desirable.

The base section 18 has guide means 58 at a front 38 that are angled to receive a bale into the elevator. Similarly, guide means 60 located towards a rear 40 of the frame 20 tapers inward and upward to guide a rear portion of a bale into the elevator. Side guide means 61 are located on either side of the frame 20 towards a rear from the augers. The bale fits between the two side guide means 61.

Figure 3:
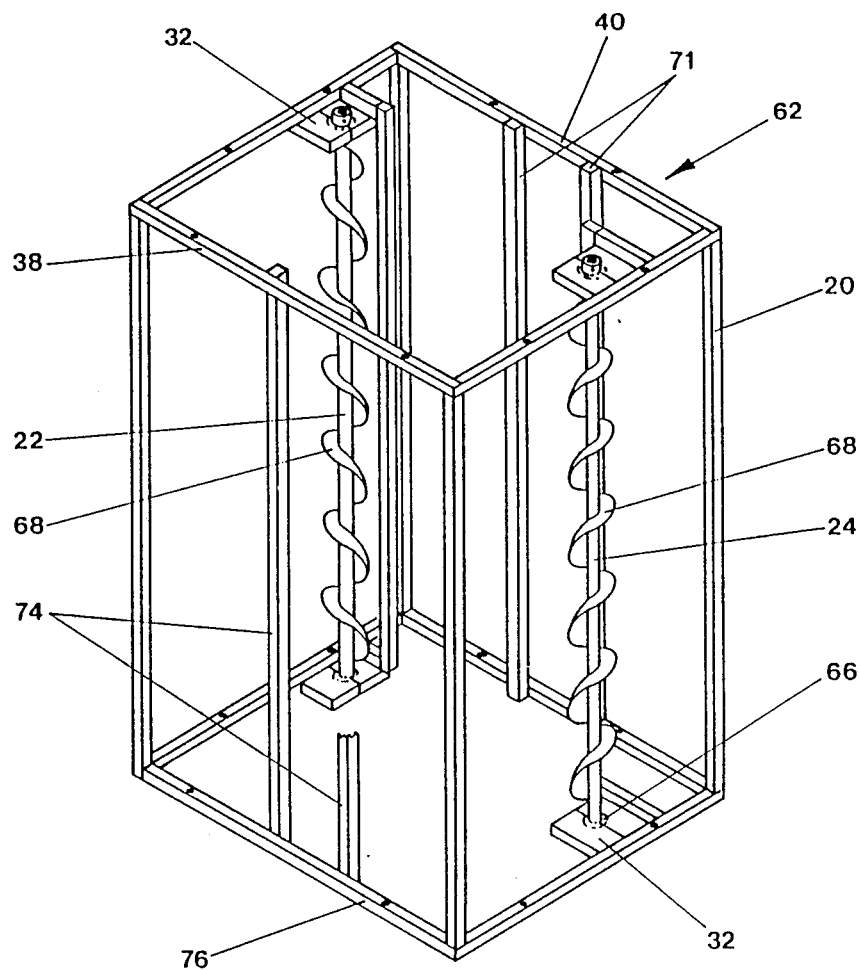
FIG. 3 is a perspective view of a middle section for the bale elevator.

In FIG. 3, there is shown a middle section 62 having a frame 20 with a front 38 and rear 40. Augers 22, 24 are located on opposite sides of the frame 20, the augers extending the full length of the frame 20 and being mounted at upper ends 64 and lower ends 66 in hardwood bearings 32. In order to rotatably mount the augers 22, 24 in the bearings 32, part of the flight 68 of each auger is cut away in the vicinity of the bearings 32. An upper end 64 of each auger 22, 24 contains a circular opening 70. A lower end 66 of each auger 22, 24 contains a cylindrical rod 72. The rod 72 is sized to fit within the opening 70 of an adjacent elevator section. Both the rod 72 and the opening 70 have horizontal holes therein so that a pin (not shown) can be inserted through the aligned holes to removably interconnect the augers of one section with the augers of an immediately adjacent section. There are guide means 74, 75 extending vertically from a bottom 76 to a top 78 along a front 38 and rear 40 respectively. Part of one of the guide means 74 is cut off so as not to interfere with the background of the view. There are also guide means 61 along either side that are extensions of the guide means 61 of the base section 18. While there can be more than one middle section in an elevator, only one section is shown in the drawings. Preferably, the middle sections are of various lengths so that the desired total length of the elevator for a particular use can easily be obtained by choosing an appropriate number of middle sections of a certain size.

Figure 4:
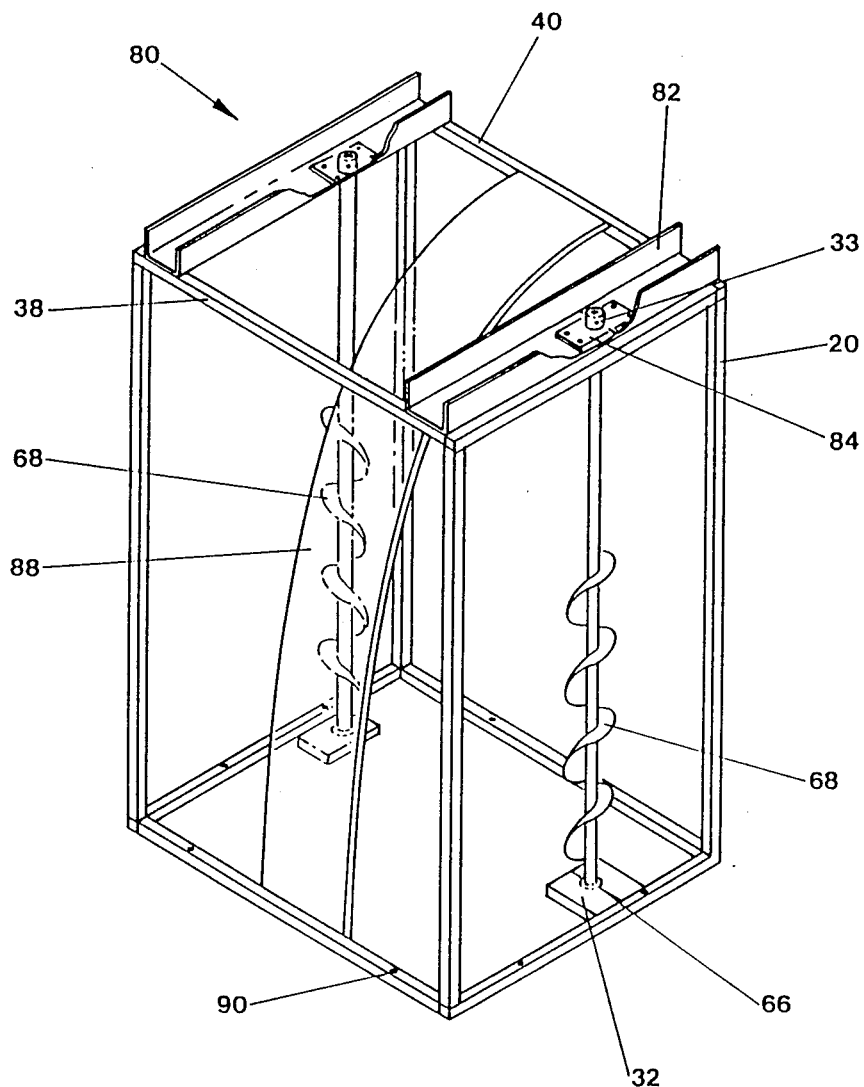
FIG. 4 is a perspective view of a discharge section of the elevator.

In FIG. 4, there is shown a top section 80 having a frame 20 with a front 38 and rear 40. The top section 80 has augers 22, 24 but the flights 68 on the augers 22, 24 terminate approximately half way up to the top section 80. As with the mid-section, the lower end 66 of the augers 22, 24 are mounted in hardwood bearings 32. The upper end 64 is mounted in supports 82 extending from the front 38 to rear 40. The supports 82 each contain a steel hanger bearing 84 with a cylindrical sleeve 33 which is affixed to the upper end 64 of each of the augers 22, 24 to hold the augers in position. Part of each support 82 is cut away to expose the bearings 84. Guide means 88 are angled toward the rear 40 of the frame 20 to direct a bale (not shown in FIG. 4) towards said rear 40 and out of the elevator. It should be noted that the top section 80 does not contain any guide means at the rear 40 or at the sides so that bales can easily exit through the rear portion of the frame 20. In other words, the rear guide means 74 and the side guide means 61 do not extend into the top section 80.

From FIGS. 2, 3 and 4, it can be seen that the frame 20 contains vertical openings therein at the upper and lower ends thereof so that various sections can be placed on top of one another. The various sections can then be affixed to one another by placing bolts (not shown) in the openings 90 of two adjacent sections and tightening the bolts with appropriate nuts (not shown). For example, the middle section 62 can be placed on top of the base section 18 so that the cylindrical rods 72 from the augers of one section extend into the corresponding openings 70 for each of the augers of the section immediately beneath it and the pins are properly inserted. Further, the frames 20 of the two section 18, 62 can be bolted together by inserting bolts through the corresponding openings 90. As a further example, the top section 80 can be mounted above the middle section 62 in the same manner. When the power source is activated, bales inserted into the base section 18 will be elevated upward from the base section through said middle section 62 and to said top section 80 where said bales will be discharged from the resultant bale elevator through a rear of the frame 20.

The augers are located at a narrow side of each bale so that they will penetrate a central portion of said narrow side. While the augers can rotate relative to one another, they cannot move longitudinally relative to the frame 20.

When it is desired to remove bales from a barn, the motor can be reversed so that the augers turn in opposite directions to exert an outward force on each bale. By removing the guide means 74 at a front 38 of one of the middle sections 62, the bale will be expelled from that middle section. The reason for discharging the bale from a middle section is that it is often desirable to transport the bale by truck. The truck can be placed so that the bale will fall by gravity into the back of the truck after leaving the elevator. Similarly, when bales are being elevated upwards, so long as both augers are turning inward to exert a rearward force on the bales, it is not absolutely necessary to have the guide means 88 in the top section as the bales will automatically be discharged through the rear by the force of the augers towards the rear. However, for safety reasons and to ensure that the bales are discharged as desired, it is recommended that the guide means 88 remain in place. To ensure that the bales moving downward will be discharged from the appropriate mid-section, guide means similar to, but the reverse of guide means 88, could be added extending from an upper rear to a lower front of said frame of the appropriate middle section.

It has been found that the size of the opening in the barn can be approximately twenty inches by thirty inches when using a bale elevator in accordance with the present inventinon. With the previous chain conveyor type elevators, a door at least five feet in height is usually required. This can constitute a danger in that there is much more room for a person to accidentally fall out of the opening. Further, with the elevator of the present invention, as the required openings are so small, various openings could be located in a barn wall at different heights so that bales could be discharged at a lower height until that level of the barn has been filled. The bales can then be discharged at successively higher heights unil each particular level has been filled. This will reduce the risk of damage to the bales caused by falling from a great height.

Preferably, the elevator is bolted to the barn every six feet. While the sections can be any convenient height, without limiting the invention in any way, it is suggested that the middle sections could be five, eight or ten feet long, the bottom section be five feet long and the top section be three feet long. When the sections are more than five feet long, the augers should be mounted in bearings every three or four feet.

It has been found that the elevator of the present invention will operate smoothly with bales of various lengths. The elevator has no difficulty in transporting bales that are "bowed". A "bowed" bale is a bale that has a bowed shape when viewed in cross-section from a narrow side. Also, the elevator of the present invention works well with bales that are not tightly packed. It has been found that an auger having a five and three-eighths inch flight mounted on a one inch pipe with a one and a quarter inch outside diameter works well. It has also been found that a suitable distance between the centres of the two augers is substantially twenty-two inches. It has also been found that a space of eighteen inches between the guide means 61 is sufficient. These measurements are not intended to be restrictive but to give guidance only. It can be understood that the elevator has a simple design. It does not jam easily and necessary repairs can usually be made by persons with minimum mechanical skill. If it were to jam, it would likely jam at the inlet which is easily accessible while standing on the ground.

What we claim as our invention is:

1. A vertical bale elevator to transfer bales of hay, straw or the like between a supporting surface and a point above the supporting surface, said elevator comprising a base section, a top section and one or more middle sections, each section having an elongated frame with a cross-section somewhat larger than the cross-section of the bale, the elongated frame of one section being designed to fit with the elongated frame of immediately adjacent sections, the base section having means to receive bale and the top section having means to discharge a bale, all sections having auger extending along opposing sides thereof, the augers of one section being designed to interconnect with the augers of immediately adjacent sections, said augers each being capable of rotating so that all said augers exert a force on a bale in the same direction, and being arranged so that a bale can be transported between the augers along the frame with part of a flight of each auger penetrating opposing sides of the bale, said frame providing guide means for the bales, said elevator having a power source to rotate the augers.

2. An elevator as claimed in claim 1 wherein each section has two augers one along each side of the frame.

3. An elevator as claimed in claim 2 wherein the augers are located so that each auger penetrates a central position of opposing sides of the bale.

4. An elevator as claimed in claim 2 wherein one auger is a right-hand auger and one auger is a left-hand auger and the augers turn in opposite directions and are powered by a single power source.

5. An elevator as claimed in claim 4 wherein the right-hand auger is on a right side of the frame and turns in a clockwise direction when viewed from a top and the left-hand auger is on a left side of the frame and turns in a counterclockwise direction when viewed from a top.

6. An elevator as claimed in any one of claim 1, 2 or 3 wherein each auger turns in a direction to force a bale within the elevator upward and inward towards a rear of said frame.

7. An elevator as claimed in any one of claim 1, 2 or 3 wherein the power source for the augers is reversible and there are means at or near a top of the elevator to receive a bale and means at or near a bottom of the elevator to discharge a bale.

8. An elevator as claimed in any one of claims 1, 2 or 3 wherein a single power source powers each auger through a gear box so that the augers can turn in opposite directions.

9. An elevator as claimed in any one of claims 1, 2 or 3 wherein the augers are located at a narrow side of each bale.

10. An elevator as claimed in claim 2 wherein the augers are located towards a front of said frame and there are side guide means located on either side of the frame towards the rear from each auger.

11. An elevator as claimed in claim 10 wherein there are no side guide means located at the means to discharge bales.

12. An elevator as claimed in any one of claims 1, 2 or 3 wherein there are bearings supporting the augers periodically along their length said bearings allowing rotation but preventing the augers from moving longitudinally relative to the frame.

13. An elevator as claimed in claim 2 wherein there are feed means adjacent to a bottom of the elevator to feed bales from a ground into the receiving means for the elevator.

14. An elevator as claimed in claim 13 wherein the feed means has conventional chain belts.

15. An elevator as claimed in any one of claims 1, 2 or 3 wherein the flights of the augers terminate approximately half the length of one bale from a top of said elevator.

16. An elevator as claimed in any one of claims 1, 2 or 3 wherein the means to receive a bale are guide means at a front and lack of the frame that taper inward and upward to guide a bale into the elevator.

17. An elevator as claimed in any one of claims 1, 2 or 3 wherein the means for discharging a bale are guide means at a front of the frame that is angled towards a rear of the frame to direct a bale towards said rear, the guide means at a rear of said frame and the side guide means being removed.

* * * * *